July 27, 1926. Re. 16,393

P. S. STEVENS

DIPPER TRIP

Original Filed Nov. 21, 1925

Paul S. Stevens. INVENTOR.

BY Sloan & Rublloff

ATTORNEYS.

Reissued July 27, 1926. Re. 16,393

UNITED STATES PATENT OFFICE.

PAUL S. STEVENS, OF SOUTH MILWAUKEE, WISCONSIN, ASSIGNOR TO BUCYRUS COMPANY, OF SOUTH MILWAUKEE, WISCONSIN.

DIPPER TRIP.

Original No. 1,574,763, dated March 2, 1926, Serial No. 70,565, filed November 21, 1925. Application for reissue filed April 14, 1926. Serial No. 102,092.

This invention relates to excavating machinery and more particularly to that type of excavating machine commonly known as a power shovel, the primary object of the invention being to provide novel means for causing the bottom of the dipper of such shovel to be released for dumping the load.

In the usual construction of power shovels, the excavating dipper is mounted on the end of a pair of dipper-sticks, or handle, which is designed to reciprocate with respect to, and swing about, a certain point on the boom of the excavator. The dipper is provided with a hinged bottom, which is releasably held closed by means of a latch mechanism.

In the usual construction of a dipper trip, a rope extends from this latch to the operator's position on the main platform of the machine. In variations of this device, particularly when power is employed to do the tripping, elaborate means have been devised to compensate for the reciprocating and swinging movements of the dipper-handle. Such a complicated device can be avoided, if a feasible means is found for mounting the tripping motor on the dipper-handle itself.

In an electrical excavator, where electricity is the only power available, new complications are introduced, due to the employment of a rotating motor to supply the force for the tripping.

In devices in which this motor is mounted on the main platform, a light current must continuously pass through it, to take up the slack in the trip rope as the dipper-handle swings and reciprocates. This current tends to overheat and burn out the motor.

And, regardless of the location of the motor, there has always been required an elaborate electrical mechanism to cut out the current the instant that tripping has been accomplished. Otherwise the motor will stall; and, unless special overload relays are provided to prevent holding a high torque with full voltage, this would burn out the motor. Furthermore the motor will be brought up to stalling with such a jar, that the fly-wheel energy built up in the rotating armature will wear out the drum and ropes and chains, and will even bend the motor-shaft.

It is one of the objects of my invention to do away with these evils, by providing a rotating motor which will actuate a dipper trip without the possibility of overheating or stalling, and without the need of elaborate control.

Other objects and advantages of my invention will be evident to those skilled in the art, and therefore need not be herein more specifically set forth.

The invention consists in the novel parts and in the combinations and arrangements defined in the appended claims, and of which one embodiment is exemplified in the accompanying drawings, which are hereinafter particularly described and explained.

Throughout, the same reference number is applied to the same or similar members.

Figure 1:
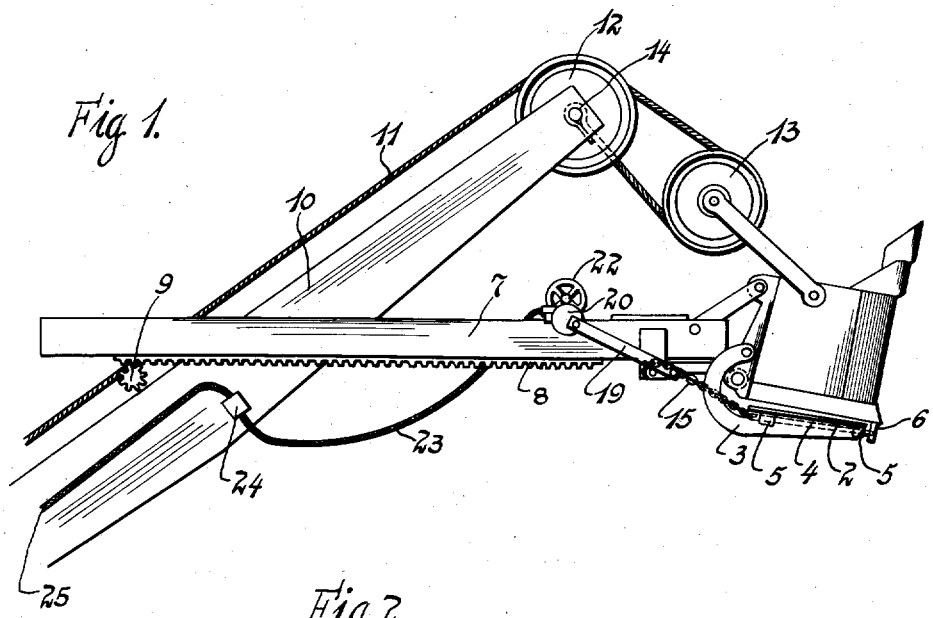
Figure 1 is a side elevation of a dipper, dipper-handle and some of the related parts of a power shovel, showing my dipper trip mechanism in place.
Figure 2:
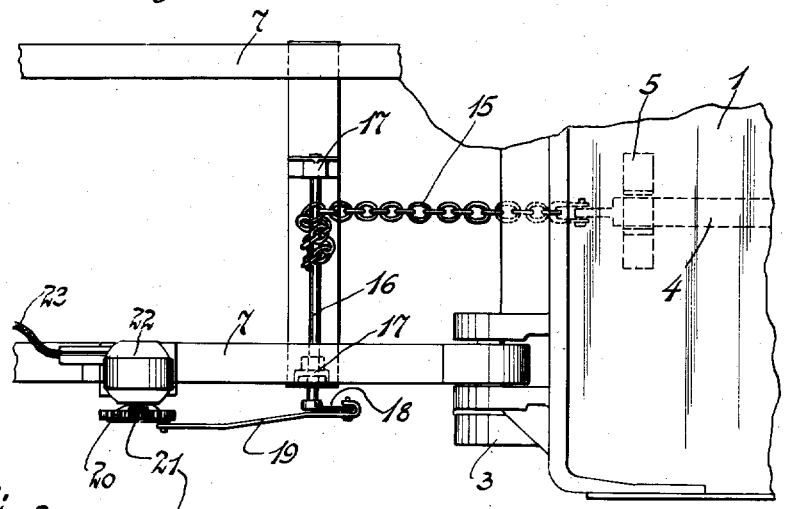
Figure 2 is an enlarged plan view of part of a dipper and its two handles, with my dipper trip in place.

The dipper 1 has a swinging bottom 2 held by the hinge 3. The bottom is held closed by the latch 4 which slides in guides 5 and engages a latch-keeper 6.

The latch may be induced to engage the latch-keeper by means of gravity, or any other adequate actuating means.

The dipper 1 is secured at the end of dipper-handles 7.

In the particular exemplification shown, these handles are provided with racks 8 for engagement with shipper-shaft pinions 9, mounted for rotation on the boom 10. The rotation of these pinions by any suitable means (not shown) thrusts the dipper in and out. In the particular exemplification shown, the dipper and handle are swung about the shipper-shaft by means of the hoist-rope 11, which passes over the sheave 12 at the point of the boom, and thence around the padlock-sheave 13 which supports the dipper, and thence to a place of anchorage 14 on the boom.

From the latch 4, a chain 15, or other appropriate flexible means, passes to, is wound around, and is anchored to a drum 16, mounted in journals 17 on the dipper-handle 7. On one end of this drum 16, there is a lever 18, which is actuated by a connecting-rod 19, which extends to and is actuated by a wheel, 20, journally mounted on one of the handles 7. The word "drum," as used herein, is intended to mean any member, such as a drum or shaft, which performs the functions of a drum. The word "wheel", as used in the claims herein, shall be taken to mean any rotatable element including a centrally pivoted disc, a gear or pinion, a crank-arm, a cam, or an eccentric. And the word "center" as referring to such wheel shall be taken to mean the center of rotation of such wheel. The connecting-rod 19, although shown as one integral piece, may be made of parts permitting such adjustment in the length of this unit as may be required. An appropriate leverage system may be substituted for the chain 15, shaft 16 and lever 18. The connecting-rod 19 may be made flexible.

The gear 20 is rotated by a pinion 21 mounted on the end of the shaft of an electric motor 22.

This motor is electrically connected to the power source by means of a flexible conductor 23, a cable take-up box 24 of any appropriate design, a conductor 25 extending to the operator's position, and a switch of any appropriate design (not shown) under the control of the operator.

Figure 3:
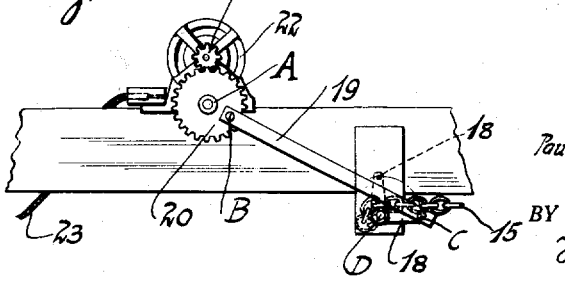
Figure 3 is an enlarged side elevation of the motor and related parts of my dipper trip mechanism shown in Figure 1.

For the purposes of the following geometrical explanation, I have lettered four points in Figure 3 as follows: A is the center of the wheel 20; B is the point of connection of the connecting-rod 19 and the wheel 20; C is the point of connection of the connecting-rod 19 and the lever 18; D is the center of rotation of the lever 18.

The parts 18, 19 and 20 are so proportioned and the points A and D are so located that AB is appreciably less than DC; and so that, if of BC and AD, either one exceeds the other, the difference between them shall be appreciably less than DC minus AB.

It will be readily seen that, when the dipper 1 has been hoisted and extended to the proper position for dumping, the operator can trip the same by closing the switch above referred to. The motor 22 will then rotate, thus rotating the pinion 21 and the gear 20. The rotation of the gear 20 will reciprocate the connecting-rod 19, thus oscillating the lever 18 back and forth between its two positions as shown in Figure 3, and thus alternately winding up and unwinding the chain 15 about the rod 16. With each winding up of the chain 15, the latch 4 will be disengaged from the latch-keeper 6, thus permitting the dipper bottom 2 to swing downward in a clockwise direction and discharge the contents of the dipper.

It will be readily seen that, no matter how long the operator holds the switch closed, and thereby keeps the motor 22 running, the chain 15 can not be wound up more than a certain predetermined amount, and that therefore there is no danger of stalling the motor or injuring any of the parts.

Although one particular embodiment of my invention has been shown, I do not intend to be limited thereto. It is within the scope of my invention to employ other types of rotating motor than those actuated by electricity, and to employ other intermediate connections between the latch and the motor than those shown and described, or suggested, herein.

Having now particularly described and illustrated one form of my improved dipper trip, I claim:

1. In a dipper trip, the combination of a dipper-handle, an excavating dipper on said handle, a dump-door to said dipper, a latch for said door, a latch-keeper for said latch, a drum journally mounted in said handle, a chain to retract said latch from said latch-keeper and extending from said latch to said drum and wound about said drum, a lever to rotate said drum, an electric motor mounted on said dipper-handle, a wheel rotated by said motor, and a connecting-rod connecting said wheel and said lever; the radius distance from the point of connection of the connecting-rod and wheel to the center of said wheel being appreciably less than the radius distance from the point of connection of the connecting-rod and lever to the center of rotation of said lever; and the difference between the length of the connecting-rod and the distance from the center of said wheel to the center of rotation of said lever being appreciably less than the difference of said radii.

2. In a dipper trip, the combination of a dipper-handle, an excavating dipper on said handle, a dump-door to said dipper, a latch for said door, a latch-keeper for said latch, a drum journally mounted in said handle, a chain to retract said latch from said latch-keeper and associated with said latch and said drum and wound about said drum, a lever to rotate said drum, an electric motor mounted on said dipper-handle, a wheel rotated by said motor, and a connecting member connecting said wheel and said lever; the radius distance from the point of connection of the connecting member and wheel to the center of said wheel being appreciably less than the radius distance from the point of connection of the connecting member and lever to the center of rotation of said lever; and the difference between the length of the connecting member and the distance from the center of said wheel to the center of rotation of said lever being appreciably less than the difference of said radii.

3. In a dipper trip, the combination of a dipper-handle, an excavating dipper on said handle, a dump-door to said dipper, a latch for said door, a drum journally mounted in said handle, a flexible member to unlatch said latch and associated with said latch and said drum and wound about said drum, a lever to rotate said drum, a power element mounted on said dipper-handle, a wheel rotated by said power element, and a connecting member connecting said wheel and said lever; the radius distance from the point of connection of the connecting member and wheel to the center of said wheel being appreciably less than the radius distance from the point of connection of the connecting member and lever to the center of rotation of said lever; and the difference between the length of the connecting member and the distance from the center of said wheel to the center of rotation of said lever being appreciably less than the difference of said radii.

4. In a dipper trip, the combination of an excavating dipper, a dump-door to said dipper, a latch for said door, a drum journally mounted in fixed relation to said dipper, a flexible member to unlatch said latch and associated with said latch and said drum and wound about said drum, a lever to rotate said drum, an electric motor mounted in fixed relation to said dipper, a wheel rotated by said motor, and connecting means connecting said wheel and said lever; the radius distance from the point of connection of the connecting means and wheel to the center of said wheel being appreciably less than the radius distance from the point of connection of the connecting means and lever to the center of rotation of said lever; and the difference between the length of the connecting means and the distance from the center of said wheel to the center of rotation of said lever being appreciably less than the difference of said radii.

5. In a dipper trip, the combination of an excavating dipper, a dump-door to said dipper, a latch for said door, a drum journally mounted in fixed relation to said dipper, a flexible member to unlatch said latch and associated with said latch and said drum and wound about said drum, a lever to rotate said drum, a motor mounted in fixed relation to said dipper, a wheel rotated by said motor and connecting means connecting said wheel and said lever; said connecting means, wheel and lever being so proportioned and disposed that a complete rotation of said wheel oscillates said lever through merely a certain predetermined arc.

6. In a dipper trip, the combination of a dipper-handle, an excavating dipper on said handle, a dump-door to said dipper, a latch for said door, a lever mounted on said handle, means to unlatch said latch and associated with said latch and said lever, a power element mounted on said dipper-handle, a wheel rotated by said power element, and connecting means connecting said wheel and said lever; the radius distance from the point of connection of the connecting means and wheel to the center of said wheel being appreciably less than the radius distance from the point of connection of the connecting means and lever to the center of rotation of said lever; and the difference between the length of the connecting means and the distance from the center of said wheel to the center of rotation of said lever being appreciably less than the difference of said radii.

7. In a dipper trip, the combination of an excavating dipper, a dump-door to said dipper, a latch for said door, a lever mounted on a pivot which bears a fixed relation to said dipper, means to unlatch said latch and associated with said latch and said lever, an electric motor mounted in fixed relation to said dipper, a wheel rotated by said motor, and connecting means connecting said wheel and said lever; the radius distance from the point of connection of the connecting means and wheel to the center of said wheel being appreciably less than the radius distance from the point of connection of the connecting means and lever to the center of rotation of said lever; and the difference between the length of the connecting means and the distance from the center of said wheel to the center of rotation of said lever being appreciably less than the difference of said radii.

8. In a dipper trip, the combination of an excavating dipper, a dump-door to said dipper, a latch for said door, a lever mounted on a pivot which bears a fixed relation to said dipper, means to unlatch said latch and associated with said latch and said lever, a motor mounted in fixed relation to said dipper, a wheel rotated by said motor, and a connecting-rod connecting said wheel and said lever; said connecting-rod, wheel and lever being so proportioned and disposed that a complete rotation of said wheel oscillates said lever through merely a certain predetermined arc.

9. In a dipper trip, the combination of an excavating dipper, a dump-door to said dipper, a latch for said door, a lever mounted on a pivot which bears a fixed relation to said dipper, means to unlatch said latch and associated with said latch and said lever, a motor mounted in fixed relation to said dipper, a wheel rotated by said motor, and connecting means connecting said wheel and said lever; said connecting means, wheel and lever being so proportioned and disposed that a complete rotation of said wheel oscillates said lever through merely a certain predetermined arc.

10. In a dipper trip, the combination of an excavating dipper, a dump-door to said dipper, a latch for said door, a latch-keeper for said latch, means to retract said latch from said latch-keeper, a motor mounted in fixed relation to said dipper, a wheel rotated by said motor, and actuating said means; said wheel and said means being so proportioned and disposed that a complete rotation of said wheel merely retracts said latch a predetermined distance.

11. In a dipper trip, the combination of an excavating dipper, a dump-door to said dipper, a latch for said door, means to unlatch said latch, a motor mounted in fixed relation to said dipper, a wheel rotated by said motor, and actuating said means; said wheel and said means being so proportioned and disposed that a complete rotation of said wheel actuates said latch not appreciably more than enough to unlatch it.

12. In a dipper trip, the combination of an excavating dipper, a dump-door to said dipper, a latch for said door, means to unlatch said latch, a motor mounted in fixed relation to said dipper, a wheel rotated by said motor, and actuating said means; said wheel and said means being so proportioned and disposed that said wheel is free to rotate continuously and that rotation of said wheel actuates said latch not appreciably more than enough to unlatch it.

PAUL S. STEVENS.